Nov. 20, 1934. C. E. HAMILTON, SR Re. 19,376

STRIPPER FINGER FOR FLATWORK IRONERS

Original Filed: April 22, 1931 2 Sheets-Sheet 1

INVENTOR
CHARLES EDWIN HAMILTON, SR.
BY Fred H. Schuetz
ATTORNEY

Nov. 20, 1934. C. E. HAMILTON, SR Re. 19,376

STRIPPER FINGER FOR FLATWORK IRONERS

Original Filed April 22, 1931 2 Sheets-Sheet 2

INVENTOR
CHARLES EDWIN HAMILTON, SR.
BY
ATTORNEY

Reissued Nov. 20, 1934

Re. 19,376

UNITED STATES PATENT OFFICE 19,376

STRIPPER FINGER FOR FLATWORK IRONERS

Charles Edwin Hamilton, Sr., Hollywood, Calif., assignor to Edwin Lane, Percy Mendelson, and Charles Mendelson, all of New York, N. Y.

Original No. 1,860,538, dated May 31, 1932, Serial No. 446,208, April 22, 1930. Application for reissue March 21, 1933, Serial No. 661,931

7 Claims. (Cl. 68—9)

The invention relates to laundry and dry cleaner machinery, more especially to the so-called flat work ironers of either the chest or cylinder type.

In accordance with the usual practice in the operation of these ironers, a plurality of cloth-covered rolls are journaled for rotation above a steam-heated revoluble drum or a chest, and the articles to be ironed are caused to be passed onward from one roll to the next by the use of a series of endless strings disposed transversely of the rolls. In order to avoid the use of such strings and the like for properly advancing the work, flexible stripper fingers have been associated with the rolls, for example as set forth in Yates U. S. Letters Patent #1,186,640 and in my prior U. S. Letters Patent #1,740,980.

The present invention relates more particularly to an improved form of stripper finger suitable for use as aforesaid; and it has for its object to provide a more efficient stripper finger and one which will readily yield when encountering an abnormal obstruction and thus avoid becoming enmeshed with the work passing through the ironing machine. A further object of the invention resides in the provision of means for introducing a predetermined resistance in the finger and which must first be overcome before the finger will yield to pass an obstruction, thus insuring against too frequent resetting of the finger which would result if the yielding action were as delicate as required with the ordinary stripper finger arrangement. A still further object of the invention resides in the provision of a substantial and rugged stripper finger and one which may be inexpensively manufactured.

In carrying out the invention, a multiplicity of the novel fingers are arranged longitudinally of a roll as set forth in the aforesaid Letters Patent; and each individual finger comprises a blade of resilient material secured rigidly to a support at its inner end, while to its free outer end there is hingedly attached a tip member designed to collapse toward the back of its carrying finger upon improper functioning of the latter.

Furthermore, a predetermined resistance is introduced to prevent collapse of the tip until said resistance has been overcome as, for example, in the provision of yieldable ears at the sides of the tip and embracing the adjacent side edges of the finger end. These ears have inwardly directed projections adapted for engagement with the said side edges and over which the edges must thus ride before permitting collapse of the tip. Lateral wings, also, are arranged to project at right angles from the sides of the tip substantially at its outer end; and the same have rounded edges adapted normally to guide and direct the work between rolls as well as to ride smoothly upon a roll when said tip collapses.

The nature of the invention, however, will best be understood when described in connection with the accompanying drawings, in which.

Figure 1:
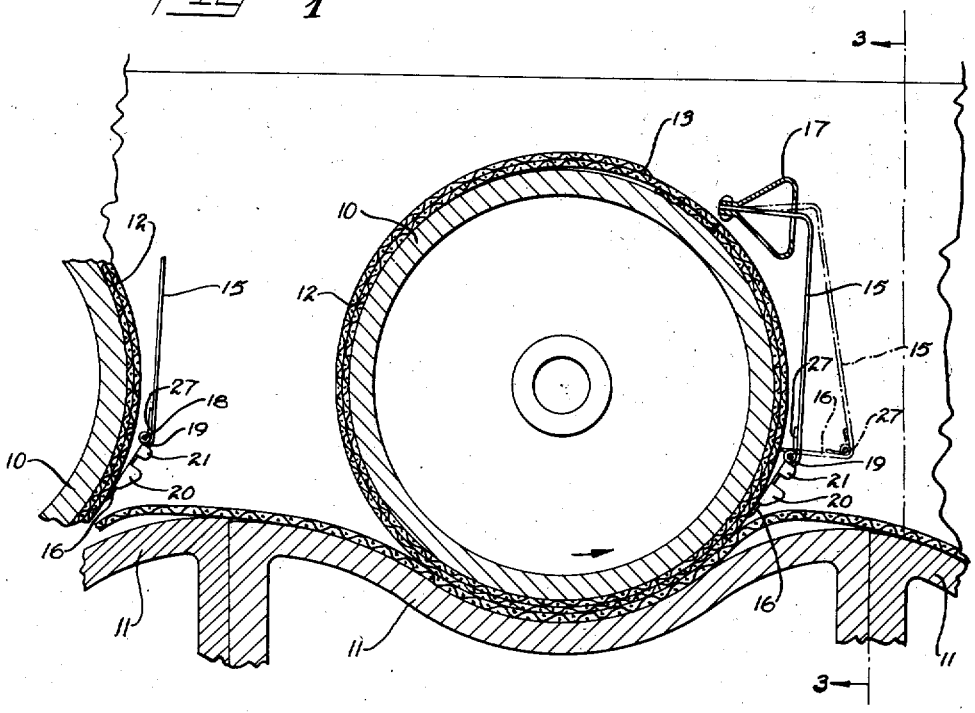
Fig. 1 is a fragmentary transverse section through an ironing roll and associated steam chest, showing the application of the novel stripper members thereto.

Referring to the drawings, 10 designates one of a plurality of revolubly actuated ironing rolls such as are utilized in an ironing machine, for example of the chest type, the said roll being journaled for rotation above a steam-heated chest 11, the surface of which immediately beneath said roll is generally concave to secure greater ironing contact. A cloth covering 12, usually hair padding, wool padding or matted padding, is frictionally held thereon by being wound over the roll with lapped portion 13 to insure retention of the cover on the roll surface. Guard or binder members 14 are also associated with the roll to prevent the lapped portion working away from the underlying cloth portion; and stripper members 15 are provided to remove the work from the roll surface as it passes from one roll to the next, all of which is more fully set forth in my copending application for U. S. Letters Patent, Serial No. 421,892. The said strippers are of narrow thin blades of flexible material such as blue tempered ribbon steel, and have a securing arm at the inner end.

Figure 4:
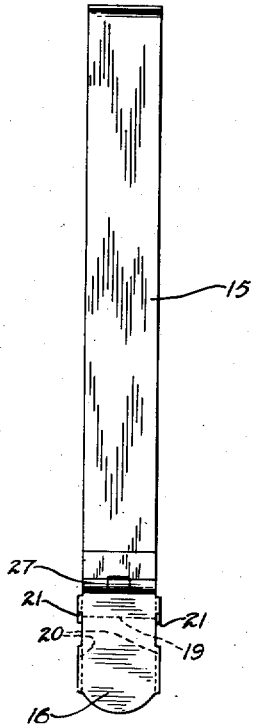
Fig. 4 is a rear elevation of a novel stripper finger, on an enlarged scale.
Figure 5:
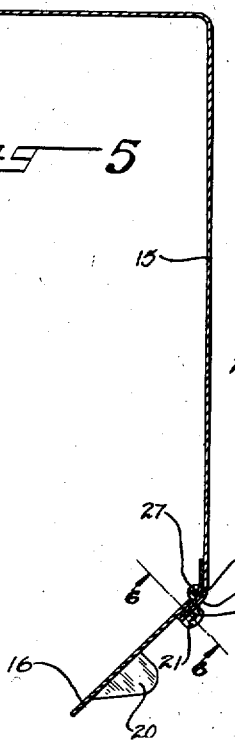
Fig. 5 is a longitudinal section thereof.
Figure 6:
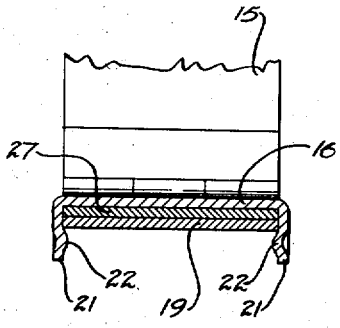
Fig. 6 is an enlarged transverse section taken on the line 6—6, Fig. 5.

The present invention, however, relates more especially to the construction and arrangement of the stripper members 15. Reference being had particularly to Figs. 4 and 5 of the drawings, it will be noted that a stripper member, contrary to the usual practice, carries at its outer and free end a secondary stripper element or tip 16, the opposite end of the stripper member being adapted to be rigidly secured, for example, to a bar or beam 17 extending longitudinally of a roll.

The said tip 16 comprises a short strip of material, preferably a thin blade; and is designed to be hingedly secured at its inner end to the outer end of the finger 15, as by means of a hinge 27. Finger 15 at its outer end, moreover, is extended somewhat beyond the pintle 18 of the hinge, and is turned over as at 19 to overlap the tip 16 so as to afford a stop for the outward movement of said tip.

Figure 2:
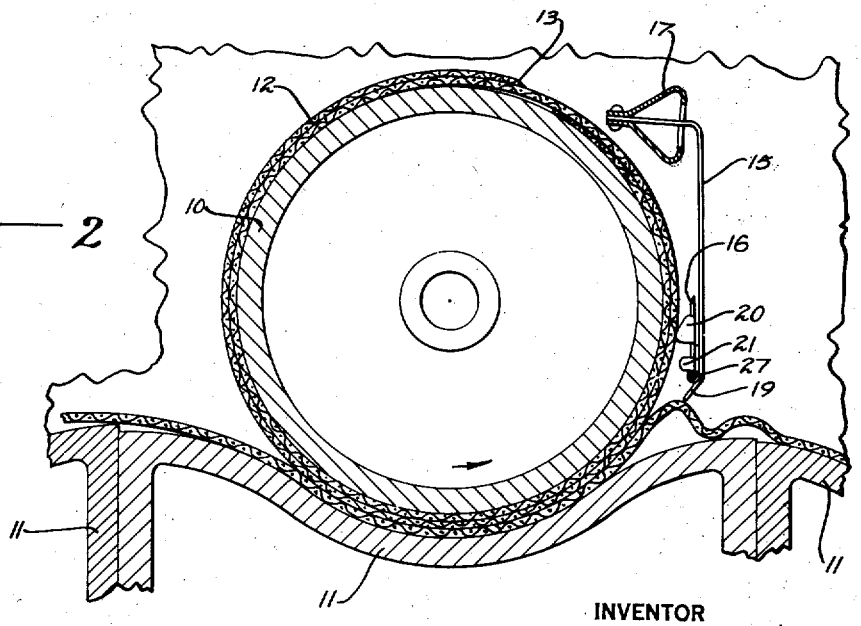
Fig. 2 is a similar view illustrating a stripper member in collapsed condition.
Figure 3:
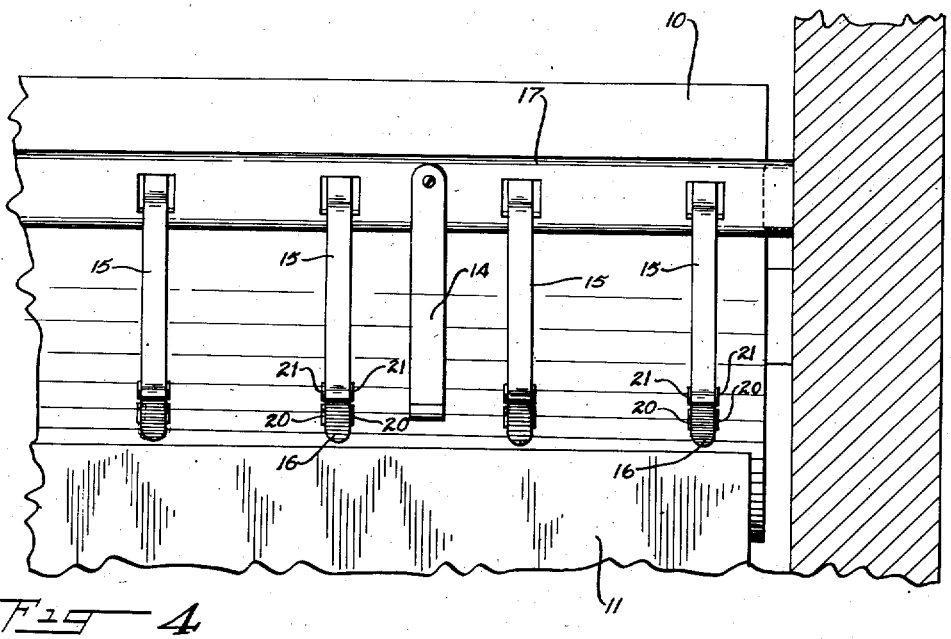
Fig. 3 is a fragmentary longitudinal section taken on the line 3—3, Fig. 1.

Normally, a substantially rigid stripping element is thereby caused to bear upon the roll surface; and in accordance with the disclosure in my aforesaid patent, the extreme end of this tip decreases in width toward the point of contact to afford an approximate point contact longitudinally of a roll, as by being of rounded contour and extremely thin. This termination of the tip serves effectively to strip the work from a roll; but if an abnormal obstruction should be encountered by the tip, the same will collapse toward the back of the finger portion proper 15 and will thus permit the said obstruction to pass without enmeshing the finger in the work, the tip then assuming the position, for example, as indicated in Fig. 2.

A pair of wings 20, furthermore, is provided substantially at the outer end of the tip to extend outwardly therefrom and at right angles thereto, each of said wings having its edges rounded to afford smooth contact with the roll surface. These wing edges, moreover, serve normally to guide and direct articles passing from one roll to the next, being inclined in the direction of the further roll, as in the manner indicated in Fig. 1.

If it should become desirable, as for example because of a defect in the cover cloth, to place one or more of these stripper fingers temporarily out of commission, it will be appreciated that this may readily be accomplished by manually collapsing such finger or fingers which, as a matter of fact, would occur automatically as aforesaid when the defect became sufficiently serious.

It is desirable, also, to prevent the too ready collapsing of a tip member as by introducing a predetermined resistance to such collapse. For example, flexible ears 21, which preferably also provide inwardly directed projections 22 as by indenting the outer surface thereof, may be caused to extend from the sides of the tip 16 at its inner end to embrace the adjacent lateral edges of the finger member; and said ears are made slightly flexible so as to yield when sufficient pressure is exerted upon the tip to cause its edges to ride over the projections and assume the collapsed position.

I claim:

1. A member for stripping material from a roll, comprising a narrow resilient finger having means at its inner end enabling it to be rigidly secured to a support, and a tip element hingedly attached to the free outer end of said finger and adapted to bear upon the surface of the roll.

2. A resilient narrow stripper finger for use in a flat work ironer including ironing rolls with lapped cover cloth, the said finger having means at its inner end enabling it to be rigidly secured to a support, a tip member hingedly attached to the free outer end of said finger, said tip being adapted normally for engagement with the roll surface to strip work therefrom, and means engaging the side edges of the finger to retain the latter in operative position and adapt it to permit collapsing toward the back of the finger upon improper functioning of the latter.

3. A resilient narrow stripper finger for use in a flat work ironer including ironing rolls with lapped cover cloth, the said finger having means at its inner end enabling it to be rigidly secured to a support, a tip member hingedly attached to the free outer end of said finger, said tip being adapted normally for engagement with the roll surface to strip work therefrom but collapsing toward the back of the finger upon improper functioning of the latter, and ears extending forwardly at the sides of the tip and yieldingly engaging the side edges of the finger.

4. A resilient narrow stripper finger for use in a flat work ironer including ironing rolls with lapped cover cloth, the said finger having means at its inner end enabling it to be rigidly secured to a support, a tip member hingedly attached to the free outer end of said finger, said tip being adapted normally for engagement with the roll surface to strip work therefrom but collapsing toward the back of the finger upon improper functioning of the latter, and ears extending forwardly at the sides of the tip, yieldingly engaging the side edges of the finger and having inwardly directed projections over which the said edges must ride before collapse of the tip occurs.

5. A resilient narrow stripper finger for use in a flat work ironer including ironing rolls with lapped cover cloth, the said finger having means at its inner end enabling it to be rigidly secured to a support, a tip member hingedly attached to the free outer end of said finger, and wings projecting forwardly at right angles to the tip at its outer end and being rounded on the front edges.

6. A resilient narrow stripper finger for use in a flat work ironer including ironing rolls with lapped cover cloth, the said finger having means at its inner end enabling it to be rigidly secured to a support, a tip member hingedly attached to the free outer end of said finger, and wings projecting forwardly at right angles to the tip at its outer end and having rounded forward edges and forwardly and upwardly inclined bottom edges.

7. A resilient narrow metal stripper member, for use in a flat work ironer including ironing rolls with lapped cover cloth, and having a finger portion and tip portion which latter is provided with guide means projecting on the delivery side of a roll for deflecting the goods, immediately the same are stripped from said roll, toward the heat chest and the nip of the next succeeding roll, said tip portion being movable relative to the finger portion of the stripper member and adapted normally to be positioned for engagement with the roll surface to strip work therefrom and adapted to collapse toward said finger portion upon improper functioning of the stripper member; and a support for said stripper finger.

CHARLES EDWIN HAMILTON, SR.